US008203769B2

(12) United States Patent
Herloski et al.

(10) Patent No.: US 8,203,769 B2
(45) Date of Patent: Jun. 19, 2012

(54) IN-LINE LINEAR VARIABLE FILTER BASED SPECTROPHOTOMETER

(75) Inventors: Robert Paul Herloski, Webster, NY (US); Jagdish Tandon, Fairport, NY (US); Martin Edward Hoover, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 584 days.

(21) Appl. No.: 12/249,200

(22) Filed: Oct. 10, 2008

(65) Prior Publication Data

US 2010/0092083 A1   Apr. 15, 2010

(51) Int. Cl.
*H04N 1/46* (2006.01)
(52) U.S. Cl. .......................... 358/505; 356/300; 356/319
(58) Field of Classification Search .................. None
See application file for complete search history.

(56) References Cited

U.S. PATENT DOCUMENTS

| | | | |
|---|---|---|---|
| 5,278,589 A | 1/1994 | Wong | |
| 5,365,074 A | 11/1994 | Genovese | |
| 6,904,255 B2 | 6/2005 | Kera et al. | |
| 6,975,949 B2 | 12/2005 | Mestha et al. | |
| 7,057,156 B2 | 6/2006 | Coates et al. | |
| 7,177,585 B2 | 2/2007 | Matsuzaka et al. | |
| 7,291,824 B2 | 11/2007 | Kiesel et al. | |
| 7,335,898 B2 * | 2/2008 | Donders et al. | 250/458.1 |
| 7,355,714 B2 | 4/2008 | Wang et al. | |
| 7,773,222 B2 * | 8/2010 | Mestha | 356/407 |
| 2006/0132787 A1 * | 6/2006 | Mestha et al. | 356/454 |
| 2007/0147189 A1 | 6/2007 | Schmidt et al. | |
| 2008/0080026 A1 | 4/2008 | Mestha et al. | |

OTHER PUBLICATIONS

Peter Kiesel et al., "Cheap and Simple Wavelength Monitors for Optical Sensing Applications,"Photonics Spectra, Mar. 2007, 5 pp.
Oliver Schmidt et al., "Performance of chip-size wavelength detectors," Optics Express, vol. 15, No. 15, Jul. 23, 207, 6 pp.
Oliver Schmidt et al., "Fluorescence spectrometer-on-a-fluidic-chip," Lab Chip (The Royal Society of Chemistry), 2007, vol. 7, p. 626-629.
Douglas P. Kancler, "Variable Spectral Scanner and Detector P/R Characterization System," Xerox Disclosure Journal, Apr. 1998.

* cited by examiner

*Primary Examiner* — Dov Popovici
*Assistant Examiner* — John Wallace
(74) *Attorney, Agent, or Firm* — Pillsbury Winthrop Shaw Pittman LLP

(57) ABSTRACT

A system for providing color analysis of a toner image on an image bearing surface with a spectrophotometer is provided. The system includes an illuminator positioned adjacent to the image bearing surface and configured to emit a light beam at the image bearing surface, a linear sensor positioned adjacent to the image bearing surface and configured to receive the light reflecting off the toner image on the image bearing surface, a gradient index lens placed in the optical path of the light beams reflecting off the image bearing surface between the image bearing surface and the linear variable filter; and the linear variable filter positioned between the linear sensor and the gradient index lens. The system is devoid of a collimating lens positioned in between the gradient index lens and the linear variable filter, and the linear variable filter and the linear sensor are spaced apart by a gap.

18 Claims, 5 Drawing Sheets

IN-LINE LINEAR VARIABLE FILTER BASED SPECTROPHOTOMETER

BACKGROUND

1. Field

The present disclosure relates to a system for providing color analysis of a toner image on an image bearing surface with a spectrophotometer.

2. Description of Related Art

In high end printing or publishing systems, spectrophotometers are used to characterize the quality of the color output of the system, and to provide a mechanism to adjust the color output characteristics of the system. In many such systems the spectrophotometer is an off-line device, in which a print from the system is carried to the spectrophotometer for measurement. For ease of use and integration, it is often desired to have the spectrophotometer inline to the print path, so that sheets or media are scanned automatically, with little or no user interaction. Current prior art inline spectrophotometers (ILS) are relatively expensive and require extensive calibration techniques.

The inventors have recognized that it would be desirable to provide a compact, low cost, spectrophotometer for in-line color output print measurements.

SUMMARY

In an embodiment, a system for providing color analysis of a toner image on an image bearing surface with a spectrophotometer is provided. The system includes an illuminator positioned adjacent to the image bearing surface, a linear sensor positioned adjacent to the image bearing surface, a gradient index lens placed in the optical path of the light beams reflecting off the image bearing surface, and a linear variable filter placed in the optical path of the light beams reflecting off the image bearing surface. The system is devoid of a collimating lens positioned in between the gradient index lens and the linear variable filter, and the linear variable filter and the linear sensor are spaced apart by a gap. The illuminator is configured to emit a light beam at the toner image on the image bearing surface. The linear sensor is configured to receive the light beams reflecting off the toner image on the image bearing surface. The gradient index lens is positioned in between the image bearing surface and the linear variable filter. The linear variable filter is positioned between the linear sensor and the gradient index lens.

In another embodiment, a method for providing color analysis of a toner image on an image bearing surface with a spectrophotometer is provided. The method includes configuring an illuminator to emit a light beam at the toner image on the image bearing surface, and configuring a linear sensor to receive the light reflecting off the toner image on the image bearing surface via a gradient index lens and a linear variable filter, wherein the optical path of the light beams reflecting off the image bearing surface is devoid of a collimating lens positioned in between the gradient index lens and the linear variable filter, and providing a gap between the linear variable filter and the linear sensor. The gradient index lens is placed in the optical path of the light beams reflecting off the image bearing surface, and is positioned in between the image bearing surface and the linear variable filter. The linear variable filter is placed in the optical path of the light beams reflecting off the image bearing surface, and is positioned between the linear sensor and the gradient index lens. The illuminator is positioned adjacent to the image bearing surface and the linear sensor is positioned adjacent to the image bearing surface.

Other objects, features, and advantages of one or more embodiments will become apparent from the following detailed description, and accompanying drawings, and the appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
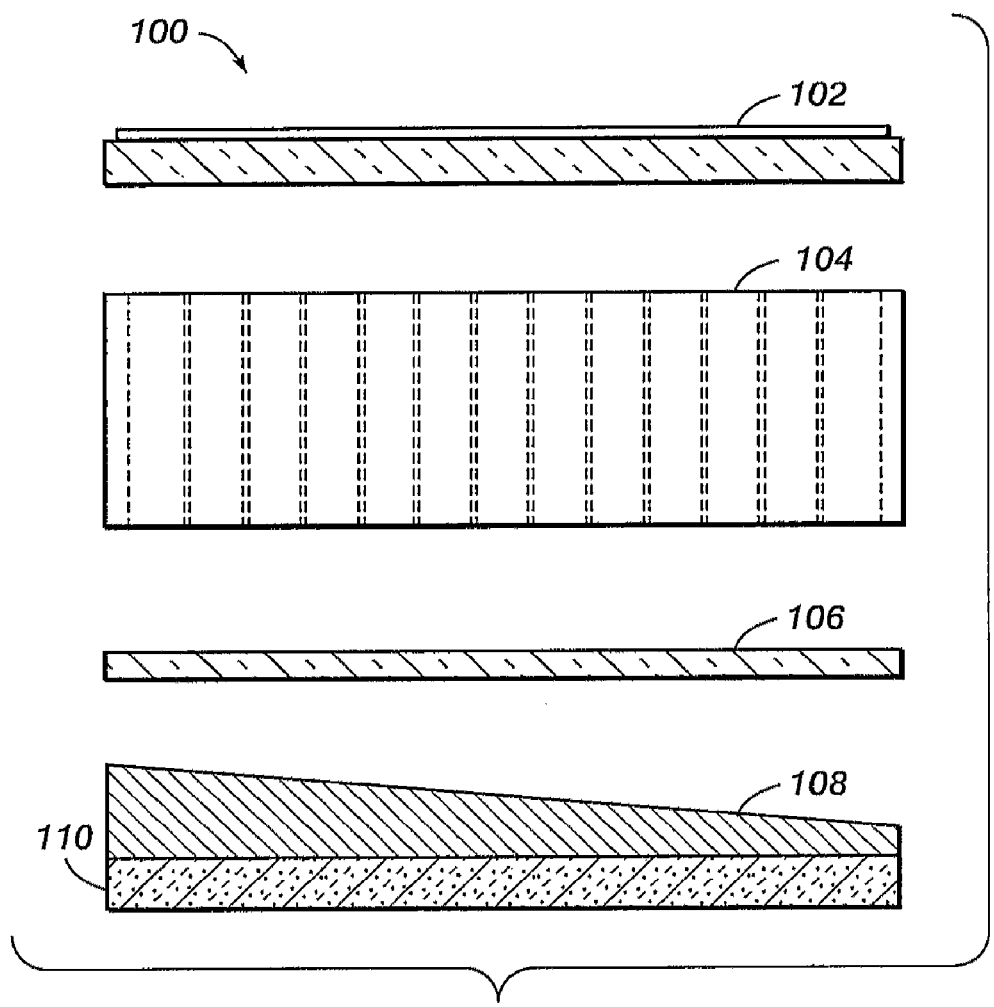
FIG. 1 shows a related art system for determining the spectral transmittance of samples with a spectrophotometer.

FIG. 1 shows a prior art system 100 that is used for determining the spectral transmittance of samples with a spectrophotometer. The system 100 includes test sample 102, an illuminator (not shown), a self-focusing lens array (e.g., Selfoc® lens array) 104, a collimating lens 106, a linear variable filter 108, and a linear sensor 110. The illuminator emits light beams at the test sample 102, and the light beams reflecting off or transmitted through the test sample 102 are received and analyzed by the linear sensor 110. The light beams reflecting off or transmitted through the test sample 102 are received by the linear sensor 110 via the Selfoc® lens array 104, the collimating lens 106, and the linear variable filter 108. The effect of effectively broadening the nominal bandpass characteristics of the linear variable filter is eliminated by collimating the light beams (i.e., reflecting off the test sample 102) entering the linear variable filter 108 and the linear sensor 110. The light beams (i.e., reflecting off or transmitted through the test sample 102) are collimated by using the collimating lens 106 positioned in between the Selfoc® lens array 104 and the linear variable filter 108.

In contrast, the present disclosure proposes a system for providing color analysis of a toner image on an image bearing surface with a spectrophotometer. The system of the present disclosure is devoid of a collimating lens positioned in between the gradient index lens (e.g., Selfoc® lens) and the linear variable filter. The present disclosure proposes maintaining a gap between the linear variable filter and the linear sensor, where the size of the gap is small enough to ensure the effect of effectively broadening the nominal bandpass characteristics of the linear variable filter is acceptable. In one embodiment, the gap maintained between the linear variable filter and the linear sensor is small, for example, in the order of 1 millimeter. In addition, the angular spread of light imaged by the gradient index lens (e.g., Selfoc lens) is also maintained small, thus, the effect of effectively broadening the nominal bandpass characteristics of the linear variable filter is acceptable.

Figure 3A:
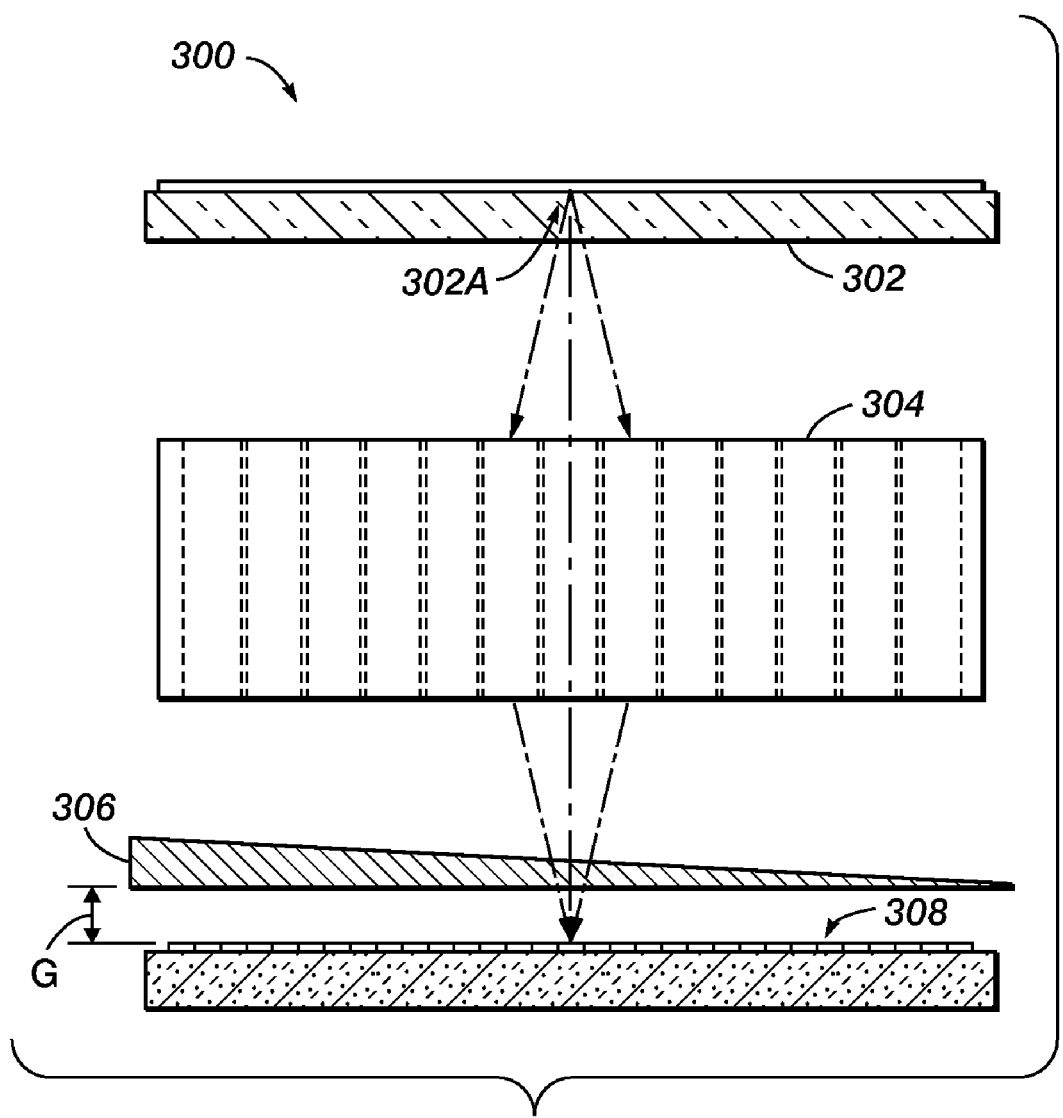
FIGS. 3A and 3B show different views of a system for providing color analysis of a toner image on an image bearing surface with a spectrophotometer in accordance with an embodiment of the present disclosure.
Figure 3B:
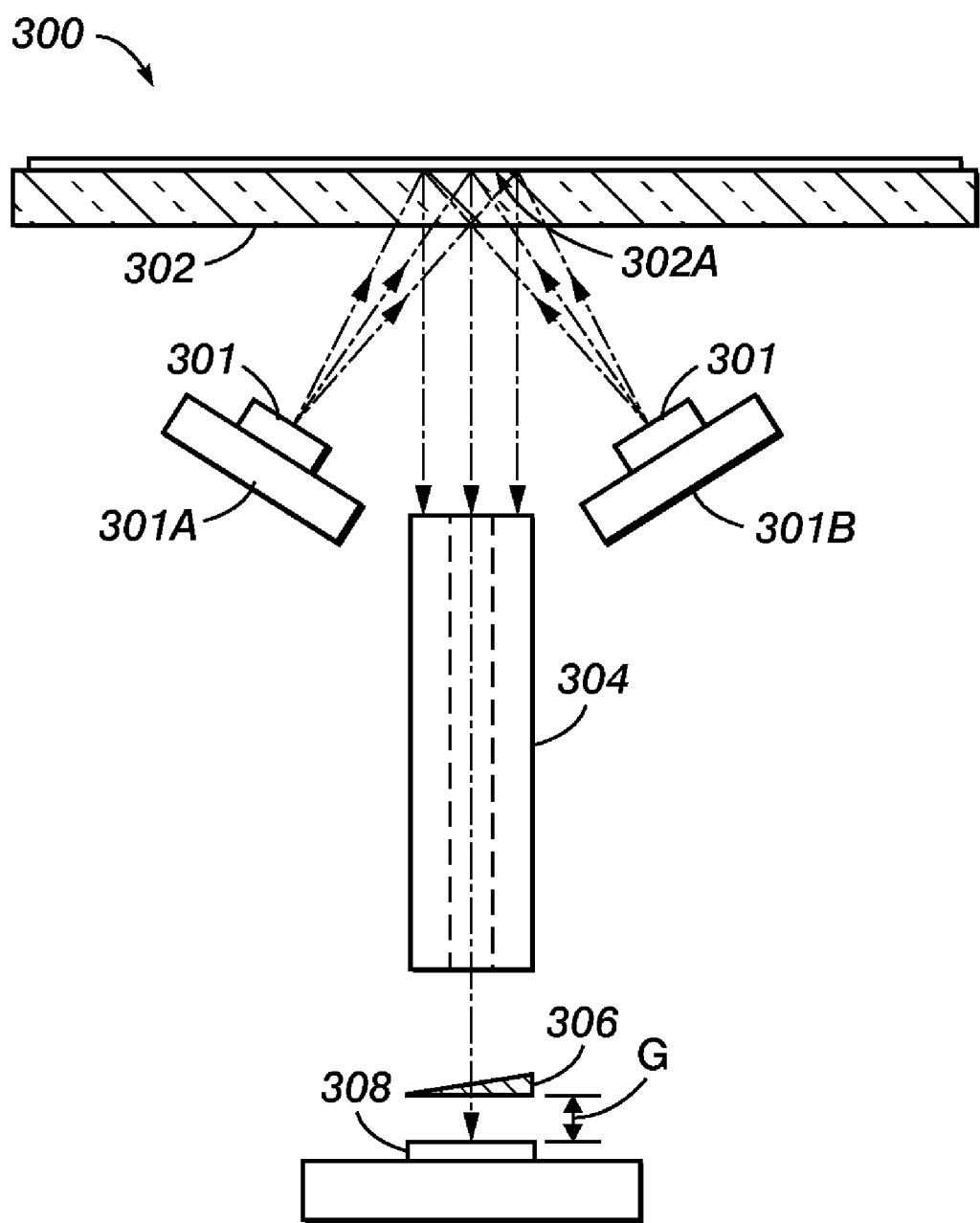

In one embodiment, as shown in FIGS. 3A and 3B, a system 300 of the present disclosure includes an illuminator 301 positioned adjacent to the image bearing surface 302, a linear sensor 308 positioned adjacent to the image bearing surface 302, a gradient index lens 304 placed in the optical path of the light beams reflecting off the image bearing surface 302; and a linear variable filter 306 placed in the optical path of the light beams reflecting off the image bearing surface 302. The system is devoid of a collimating lens positioned in between the gradient index lens 304 and the linear variable filter 306, and the linear variable filter 306 and the linear sensor 308 are spaced apart by a gap G. The illuminator 301 is configured to emit a light beam at a toner image 302A on the image bearing surface 302. The linear sensor 308 is configured to receive the light beams reflecting off the toner image 302A on the image bearing surface 302. The light beams reflecting off the toner image 302A on the image bearing surface 302 are directed to the linear sensor 308 by the gradient index lens 304. The gradient index lens 304 is positioned in between the image bearing surface 302 and the linear variable filter 306. The linear variable filter 306 is positioned between the linear sensor 308 and the gradient index lens 304.

In one embodiment, the image bearing surface 302 of an image printing system is selected from the group consisting of a photoreceptor drum, a photoreceptor belt, an intermediate transfer belt, and an intermediate transfer drum. That is, the term image bearing surface means any surface on which a toner image is received, and this may be an intermediate surface (i.e., a drum or belt on which a toner image is formed prior to transfer to the printed document). For example, a "tandem" xerographic color printing systems (e.g., U.S. Pat. Nos. 5,278,589; 5,365,074; 6,904,255 and 7,177,585, each of which are incorporated by reference), typically include plural print engines transferring respective colors sequentially to an intermediate image transfer surface (e.g., belt or drum) and then to the final substrate.

The image printing system generally has two important dimensions: a process (or slow scan) direction and a cross-process (or fast scan) direction. The direction in which the image bearing surface moves is referred to as process (or slow scan) direction, and the direction in which the plurality of sensors are oriented is referred to as cross-process (or fast scan) direction. The cross-process (or fast scan) direction is generally perpendicular to the process (or slow scan) direction.

In one embodiment, an object being imaged is a uniformly colored patch 302A, for example, on a document of interest, where the document to be scanned is illuminated by the illuminator 301.

The illuminator 301 may be an array of light emitting diodes (LEDs) or any other suitable illuminator (e.g., a fluorescent light source). For example, as shown in the illustrated embodiment in FIG. 3B, the illuminator 301 may include two linear LED arrays 301A, 301B, one on each side of the gradient index lens 304 and the linear sensor 308. In another embodiment, the illuminator 301 may include a single linear LED array. In yet another embodiment, an LED array on one side and a reflective mirror on the other side may be used instead of two linear LED arrays. The LED arrays could be all one color, e.g., white or of multiple colors, as described in U.S. Pat. No. 6,975,949, incorporated herein by reference. The illuminator arrays 301A and 301B may include a plurality of discrete illuminator elements that are spaced in a linear arrangement. Preferably, the illuminator elements are LEDs that are equally spaced at regular intervals. In one embodiment, light guides or lens arrangements may be used to transfer light from LEDs to the toner image 302A.

The gradient index lens 304 is positioned in between the image bearing surface 302 and the linear variable filter 306. In one embodiment, the gradient index lens 304 may be used to perpendicularly image the toner image 302A on the image bearing surface 302 onto the linear sensor 308. In one embodiment, the gradient index lens 304 is a Selfoc® lens or other micro lens arrangement with a predetermined acceptance angle α. A Selfoc® lens is a gradient index lens which consists of fiber rods with parabolic index profile. In one embodiment, the Selfoc® lens has an acceptance angle α of about ±9 degrees.

In one embodiment, the linear variable filter 306 is an optical narrow bandpass coated glass filter. In one embodiment, the center wavelength of the bandpass varies linearly from one end of the linear variable filter to the other. In another embodiment, the center wavelength of the bandpass varies in a logarithmic fashion along the length of the linear variable filter. In one embodiment, the linear variable filter comprises three different layers, a bandpass coating, a substrate and a blocker coating, through which the light reflecting off the image bearing surface is configured to pass therethrough. In one embodiment, the linear variable filter achieves its spectral performance with a film (e.g., a bandpass coating) that varies in thickness across its face.

Figure 2:
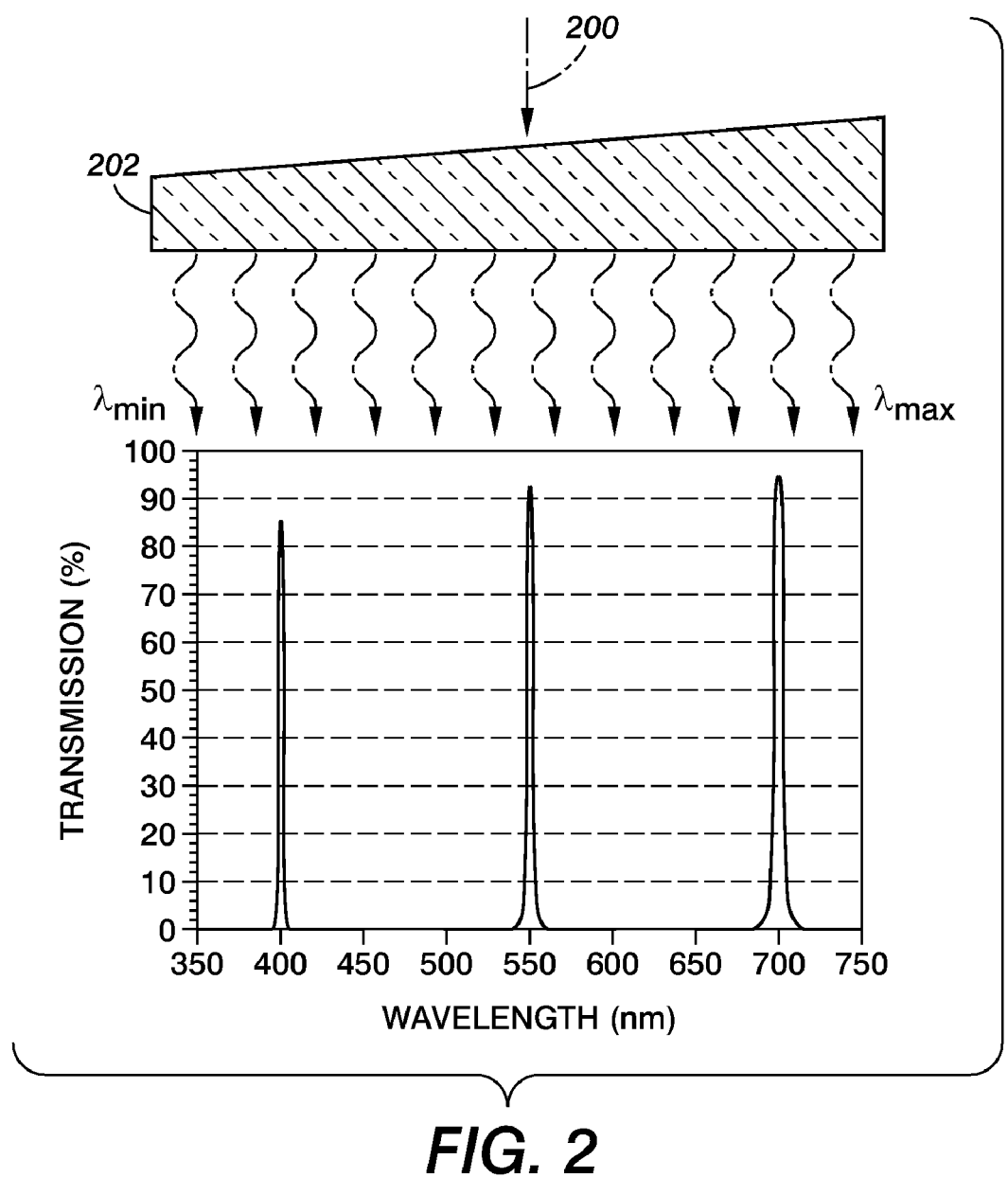
FIG. 2 shows a linear variable filter and a graph showing the spectra measured using the linear variable filter.

A linear variable filter that is used in the present disclosure is shown in FIG. 2. As shown in FIG. 2, a radiation 200 from a source (e.g., an illuminator) that produces a broad, continuous spectrum of frequencies is incident on a linear variable filter 202. In one embodiment, the radiation 200 is referred to as a broadband radiation. The graph in FIG. 2 shows the spectra measured using the linear variable filter 202. The graph in FIG. 2 illustrate the transmission in percentage along a vertical Y-axis. On a horizontal X-axis, the graphs illustrate wavelength, which is represented in nanometers.

Suitable linear variable filter of this type which are used in the present disclosure are available from JDSU. The properties or specifications of a non-limiting example of such a linear variable filter are disclosed as follows:

The spectral range of the linear variable filter is 400 to 700 nanometers. The half-power bandwidth of the linear variable filter is less than or equal to 1.5% of the center wavelength. The linear filter dispersion of the linear variable filter is 39.5 nanometer/millimeter, where the linear filter dispersion is within +/−0.8 nanometer/millimeter. The peak transmission of the linear variable filter is greater than or equal to 40% of bandpasses between 400 nanometers and 700 nanometers. The out-of-band blocking, T of the linear variable filter is less than or equal to 0.1% average and less than or equal to 0.5% absolute, for bandpasses 400 nanometers to 700 nanometers. The overall filter length of the linear variable filter is 8.87 millimeter, where the overall filter length is within +/−0.05 millimeter. The length of active area of the linear variable filter is 7.6 millimeter (approximately 180 pixels) nominal, approximately centered on the part. The overall filter width of the linear variable filter is 1.00 millimeter, where the overall filter width is within +/−0.05 millimeter. The filter thickness of the linear variable filter is 1.1 millimeter, where the filter thickness is within +/−0.1 millimeter.

Referring back to FIGS. 3A and 3B, in one embodiment, the linear sensor 308 is, for example, a full width array (FWA) sensor. A full width array sensor is defined as a sensor that extends substantially an entire width (perpendicular to a direction of motion) of the moving image bearing surface. The full width array sensor is configured to detect any desired part of the printed image, while printing real images. The full width array sensor may include a plurality of sensors equally spaced at intervals (e.g., every 1/600th inch (600 spots per inch)) in the cross-process (or fast scan) direction. See for example, U.S. Pat. No. 6,975,949, incorporated herein by reference. It is understood that other linear array sensors may also be used, such as contact image sensors, CMOS array sensors or CCD array sensors.

It is contemplated that the present disclosure may use a sensor chip, which is significantly smaller than the width of the image bearing surface. The sensor chip is configured to detect only a portion of the printed image, and not the entire width of the printed image.

In one embodiment, the system 300 of the present disclosure may be a spot or patch spectrophotometer for performing spot measurements. FIG. 3A shows a spot sensor architecture in which the linear sensor is a single chip sensor. In the spot sensor architecture, the chip sensor includes a single row, where the row includes M number of pixels. In the spot sensor architecture, the orientation of a wedge of the linear variable filter is along the length of the linear sensor or the chip sensor, where each pixel of the chip sensor correspond to a different color of the colored patch.

It is contemplated that the present disclosure may also be used for a page width spatially resolved spectral imaging. In such an embodiment, the full-width array sensor includes N number of rows, where each row of the full-width array sensor corresponds to each color of the colored patch. Each of the rows includes M number of pixels. In the full-width array sensor architecture, the orientation of the wedge of the linear variable filter is perpendicular to the orientation of the wedge of the linear variable filter in the spot sensor architecture. In other words, the orientation of the wedge of the linear variable filter is along the N number of rows of the full-width array sensor.

In one embodiment, when used with illumination from the illuminator, the output of the linear sensor will indicate the reflectivity across the spectrum. In one embodiment, a processor may be provided to both calibrate the linear sensor and to process the reflectance data detected by the linear sensor. It could be dedicated hardware like ASICs or FPGAs, software, or a combination of dedicated hardware and software.

The net result of the system is that the nominal bandpass characteristics of the linear variable filter 306 are effectively broadened due to the gap between the linear variable filter 306 and the linear sensor 308. However, as noted above, the present disclosure proposes that if the gap G between the linear variable filter 308 to the linear sensor 308 is small enough, and the angular spread of light imaged by the gradient index lens 304 is small enough, then these effects are acceptable.

In one embodiment, as shown in FIGS. 3A and 3B, the linear variable filter 306 and the linear sensor 308 are spaced apart by the gap G. In one embodiment, the gap G is maintained small, for example, 1 millimeter as described in detail in an example below. In another embodiment, the gap G may be more than or less than 1 millimeter. In one embodiment, the allowable gap between the linear variable filter 306 and the linear sensor 308 depends upon a desired resolution in a spectral measurement by an end user, while still keeping the effect of effectively broadening the nominal bandpass characteristics of the linear variable filter acceptable. For example, if a first end user only needs half as much spectral resolution as a second end user, then, to zeroeth order, the first end user can have twice as much gap G between the linear variable filter 306 and the linear sensor 308 as the second end user. In one embodiment, the gap is reduced to such a point that the residual error induced by that gap is acceptable to the image quality of the system. In other words, for a reasonable gap the redemption of image quality is negligible. In one embodiment, the gap G between the linear variable filter 306 and the linear sensor 308 is maintained in the order of 1 millimeter so that the end user may position a cover glass or the like in between the linear variable filter and the linear sensor.

Referring to FIGS. 3A and 3B, in one embodiment, as noted above, the object being imaged is the uniformly colored patch 302A. In one embodiment, different portions of the uniformly colored patch 302A are imaged to different pixels of the linear sensor 308. In one embodiment, located above each pixel of the linear sensor 308 is a particular portion of the linear variable filter 306 and its spectral bandpass characteristics. Thus, each pixel of the linear sensor 308 responds to light that only falls within the bandpass of the neighboring the linear variable filter section. The collection of pixel outputs, thus, represent the spectral content of the uniformly colored patch 302A, including the contribution from the illumination. In one embodiment, calibration techniques may be used later to separate out the illumination contribution, thus, leaving just the spectral reflectance information of the uniformly colored patch 302A.

The light beams reflecting off the uniformly colored patch 302A are imaged by the gradient index lens 304 onto the linear sensor 308. If the linear variable filter is placed in close proximity to the linear sensor, the pixel outputs from the linear sensor will correspond to light beams that has been wavelength-filtered by the linear variable filter. For example, assuming the spectral range of the linear variable filter is 400 nanometers to 700 nanometers, the output of pixel #1 of the linear sensor corresponds to the amount of light at 400 nanometers, and the output of pixel #n of the linear sensor corresponds to the amount of light at 700 nanometers, etc.

When the linear variable filter is preferably not located at the image plane, or the linear variable filter is preferably not located at the focal point of the lens, then this may result in a mixing problem. There are two situations of interest, described below in greater detail, that relate to mixing of information between the spatial extent of the patch of interest and the linear variable filter, when the linear variable filter is preferably not in perfect imaging condition.

In the first situation, the light beams reflecting off a point in the object plane (e.g., plane in which the uniformly colored patch 302A is placed) that are contained within the acceptance angle α of the self-focusing gradient index lens 304 are imaged onto the linear sensor 308. Preferably, if the linear variable filter 306 is not placed on the linear sensor 308, various parts of the cone of light pass through slightly different portions of the linear variable filter 306, hence the linear sensor pixel at the image of that particular point collects light beams that represent a weighted average of light with slightly different bandpass characteristics.

In the second situation, there are light beams from a different object (e.g., uniformly colored patch 302A) point that passes through the nominal bandpass location of the pixel of interest on the linear sensor. Thus, a neighboring pixel on the linear sensor responds to the light beams, the spectral content of which was intended for a different pixel on the linear sensor 308. The second situation may not be important in the case where the light beams reflecting off the uniformly colored patch are imaged by the self-focusing gradient index lens (e.g., Selfoc® lens) onto the linear sensor.

In one embodiment, a reasonable gap may be maintained between the linear variable filter and the linear sensor to maintain the above discussed mixing conditions small enough to get an acceptable image quality performance of the system.

Discussed below is an example that shows that a small gap G, for example, in the order of 1 millimeter, between the linear variable filter and the linear sensor keeps the effect of effectively broadening the nominal bandpass characteristics of the linear variable filter acceptable.

EXAMPLE

A typical self-focusing gradient index lens (e.g., Selfoc® lens) used for imaging constrains all imaged light to a cone of +/−9 degrees. In other words, the self-focusing gradient index lens (e.g., Selfoc® lens) has an acceptance angle $\alpha$ of about ±9 degrees. In one embodiment, the imaging condition is not necessarily needed for a spot sensor, however, spatially resolved page sensors will require imaging.

If the nominal distance or the gap G between the linear variable filter and the linear sensor is 1 mm, then the "circle of confusion" on the linear variable filter (or, equivalently, at the linear sensor) is +/−0.16 mm. In one embodiment, the "circle of confusion" is obtained by calculating the tangent of the acceptance angle of the self-focusing gradient index lens. For example, the tangent of the acceptance angle $\alpha$ of the self-focusing gradient index lens (e.g., about ±9 degrees) is +/−0.16 mm As disclosed above, the half-power bandwidth (HPBW) of the linear variable filter is less than or equal to 1.5% of the center wavelength (CWL) of bandpass of the linear variable filter. As shown in FIG. 2, the center wavelength of bandpass of the linear variable filter is 550 nm. For the center wavelength of bandpass of the linear variable filter is equal to 550 nm, the half-power bandwidth of the linear variable filter is less than or equal to 8.3 nm. Also, as disclosed above, linear filter dispersion of the linear variable filter is 39.5 nanometer/millimeter, where the linear filter dispersion is within +/−0.8 nanometer/millimeter. So, the circle of confusion will create a weighted additional wavelength spread of +/−6 nm. This is obtained by calculating the product of the linear filter dispersion (e.g., 39.5 nanometer/millimeter) of the linear variable filter and the circle of confusion on the linear variable filter.

Thus, the effective bandpass of the linear variable filter will be broadened slightly by the convolution of the linear variable filter inherent half-power bandwidth and the angularly weighted circle of confusion, but not unacceptably. Even if the half-power bandwidth of the linear variable filter doubles to 16 nanometers, that represents (700−400)/16=19 distinct wavelength samples, which is more than the number of samples of the other in-line spectrophotometers. In addition, because each "distinct" wavelength sample consists of multiple pixels at slightly different wavelength shifts, much more spectral information is available for analysis.

The present disclosure, thus, provides a sensing system that images a colored patch onto the linear variable filter and linear sensor assembly, where the pixel output of the sensing system will correspond to the relative spectral reflectivity of the colored patch, which can then be used to determine and influence the color performance of the image printing system. As noted above, the concept discussed in the present disclosure may be used for both spot measurement as well as page width spatially resolved spectral imaging. The linear variable filter placed between a linear sensor and a gradient index lens creates a compact, low cost, spectrophotometer for in-line color output print measurement. One of the advantages of the present disclosure is to provide a spectrophotometer for in-line color output print measurement, the spectrophotometer having a much lower cost compared to other alternatives of inline spectrophotometers.

Figure 4:
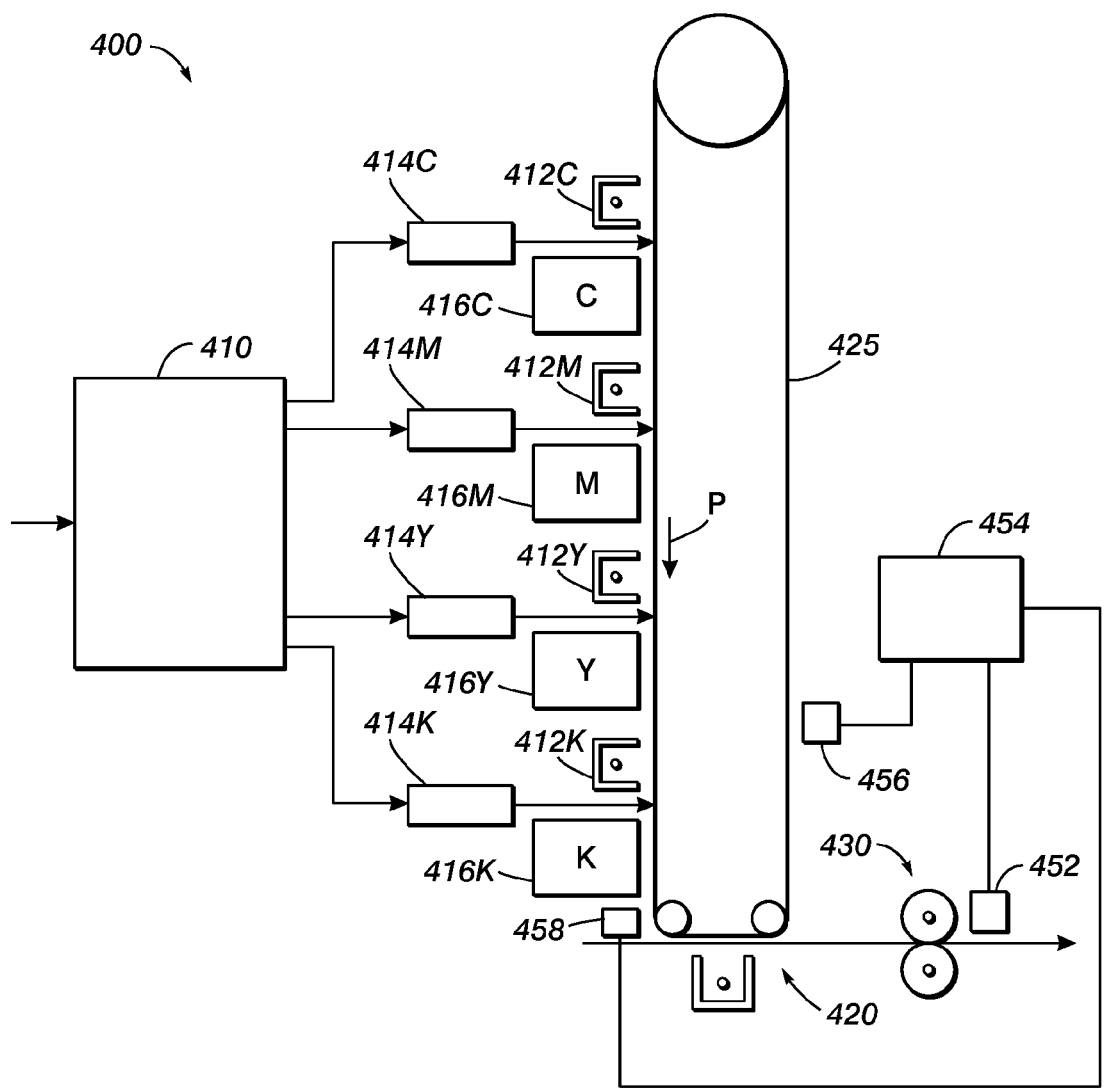
FIG. 4 is a simplified elevational view of basic elements of a xerographic color printer, showing a context of the various embodiments.

FIG. 4 is a simplified elevational view of basic elements of an image printing system, showing a context of the present disclosure. Specifically, there is shown an "image-on-image" xerographic color printer, in which successive primary-color images are accumulated on an image bearing surface (e.g., photoreceptor belt), and the accumulated superimposed images are in one step directly transferred to an output sheet as a full-color image. In one implementation, the Xerox® iGen3® digital printing press may be utilized. However, it is appreciated that any image printing system, such as monochrome machines using any technology, machines which print on photosensitive substrates, xerographic machines with multiple photoreceptors, or ink-jet-based machines, can beneficially utilize the present disclosure as well.

Specifically, the FIG. 4 embodiment includes an image bearing surface 410 (e.g., belt photoreceptor), along which are disposed a series of stations, as is generally familiar in the art of xerography, one set for each primary color to be printed. For instance, to place a cyan color separation image on the image bearing surface 410, there is used a charge corotron 412C, an imaging laser 414C, and a development unit 416C. For successive color separations, there is provided equivalent elements 412M, 414M, 416M (for magenta), 412Y, 414Y, 416Y (for yellow), and 412K, 414K, 416K (for black). The successive color separations are built up in a superimposed manner on the surface of the image bearing surface 425, and then the combined full-color image is transferred at transfer station 420 to an output sheet. The output sheet is then run through a fuser 430, as is familiar in xerography. Printing process may be controlled, for example, by a print controller 410.

As is familiar in the art of "laser printing," by coordinating the modulation of the various lasers with the motion of the image bearing surface 425 and other hardware (such as rotating mirrors, etc., not shown), the lasers discharge areas on the image bearing surface 425 to create the desired printing, particularly after these areas are developed by their respective development units 416C, 416M, 416Y, 416K.

In one embodiment, the sensing system 300 of the present disclosure (as shown in FIGS. 3A and 3B) may be placed in the image printing system to directly monitor printed images as they exit the device, for example, at location 452. In another embodiment, the sensing system 300 of the present disclosure (as shown in FIGS. 3A and 3B) can be placed just before or just after the transfer station 420 where the toner is transferred to the sheet or media, for example, at locations 456, 458 for monitoring images directly on the image bearing surface or other intermediate transfer members. The sensing system 300 of the present disclosure (as shown in FIGS. 3A and 3B) can make measurements of toner images created on the image bearing surface 425 (such as sensing devices 456 and 458) or to printed images which were transferred to an output sheet (such as sensing device 452). There may be provided any number of sensing device placed anywhere in the printer as needed, not only in the locations illustrated.

The sensing devices 452, 456 and 458 provide feed back to a control device 454 for taking action in response to critical measurements taken. The information gathered therefrom is used by control device 454 and/or the print controller 410 in various ways to aid in the operation of the printer, whether in a real-time feedback loop, an offline calibration process, a registration system, etc. While the control device 454 are shown in the figure as being separate elements, it will be appreciated that in some implementations, the control device 454 may be a part of the print controller 410.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the invention following, in general, the principles of the invention and including such departures from the present disclosure as come within known or customary practice in the art to which the invention pertains, and as may be applied to the essential features hereinbefore set forth and followed in the spirit and scope of the appended claims.

What is claimed is:

1. A system for providing color analysis of a toner image on an image bearing surface with a spectrophotometer, the system comprising:
    an illuminator positioned adjacent to the image bearing surface, the illuminator being configured to emit a light beam at the toner image on the image bearing surface;
    a linear sensor positioned adjacent to the image bearing surface, the linear sensor being configured to receive the light reflecting off the toner image on the image bearing surface;
    a gradient index lens placed in an optical path of the light beams reflecting off the image bearing surface, the gradient index lens positioned in between the image bearing surface and a linear variable filter, wherein the linear variable filter is an optical filter having a bandpass coating and a property of the bandpass coating being varied across the length of the linear variable filter so as to shift the center wavelength of the linear variable filter linearly across the length of the linear variable filter; and
    the linear variable filter placed in the optical path of the light beams reflecting off the image bearing surface, the linear variable filter positioned between the linear sensor and the gradient index lens,
    wherein the system is devoid of a collimating lens positioned in between the gradient index lens and the linear variable filter, and the linear variable filter and the linear sensor are spaced apart by a gap,
    wherein the gap between the linear variable filter and the linear sensor is selected so as to maintain the effect of effectively broadening the nominal bandpass characteristics of the linear variable filter whereby a residual error induced by the gap is acceptable to an image quality of the system.

2. A system in accordance with claim 1, wherein the linear sensor is a full width array image sensor.

3. A system in accordance with claim 1, wherein the linear sensor is an image sensor chip.

4. A system in accordance with claim 1, further comprising a processor, wherein the processor is configured to determine color performance of an image printing system based on spectral reflectivity of the toner image received from the linear sensor.

5. A system in accordance with claim 1, wherein the image bearing surface is at least one of a photoreceptor drum, a photoreceptor belt, an intermediate transfer belt, an intermediate transfer drum, an imaging drum, or a document.

6. A system in accordance with claim 1, wherein the property of the bandpass coating is a thickness of the coating.

7. A system in accordance with claim 1, wherein the gap between the linear variable filter and the linear sensor is maintained in the order of 1 millimeter.

8. A system in accordance with claim 1, wherein the gap between the linear variable filter and the linear sensor depends on a desired resolution in a spectral measurement by a user.

9. A system in accordance with claim 1, wherein the system is configured to provide both spot measurements and page width spatially resolved spectral imaging measurements.

10. A method for providing color analysis of a toner image on an image bearing surface with a spectrophotometer, the method comprising:
    configuring an illuminator to emit a light beam at the toner image on the image bearing surface, the illuminator being positioned adjacent to the image bearing surface; and
    configuring a linear sensor to receive the light reflecting off the toner image on the image bearing surface via a gradient index lens and a linear variable filter, the linear sensor being positioned adjacent to the image bearing surface,
    the gradient index lens being placed in an optical path of the light beams reflecting off the image bearing surface, and being positioned in between the image bearing surface and a linear variable filter,
    the linear variable filter being placed in the optical path of the light beams reflecting off the image bearing surface, and being positioned between the linear sensor and the gradient index lens;
    wherein the optical path of the light beams reflecting off the image bearing surface is devoid of a collimating lens positioned in between the gradient index lens and the linear variable filter, and providing a gap between the linear variable filter and the linear sensor,
    wherein the linear variable filter is an optical filter having a bandpass coating and a property of the bandpass coating being varied across the length of the linear variable filter so as to shift the center wavelength of the linear variable filter linearly across the length of the linear variable filter, and
    wherein the gap between the linear variable filter and the linear sensor is selected so as to maintain the effect of effectively broadening the nominal bandpass characteristics of the linear variable filter whereby a residual error induced by the gap is acceptable to an image quality.

11. A method in accordance with claim 10, wherein the linear sensor is a full width array image sensor.

12. A method in accordance with claim 10, wherein the linear sensor is an image sensor chip.

13. A method in accordance with claim 10, further comprising configuring a processor to determine color performance of an image printing system based on spectral reflectivity of the toner image received from the linear sensor.

14. A method in accordance with claim 10, wherein the image bearing surface is at least one of a photoreceptor drum, a photoreceptor belt, an intermediate transfer belt, an intermediate transfer drum, an imaging drum, or a document.

15. A method in accordance with claim 10, wherein the property of the bandpass coating is a thickness of the coating.

16. A method in accordance with claim 10, wherein the gap between the linear variable filter and the linear sensor is maintained in the order of 1 millimeter.

17. A method in accordance with claim 10, wherein the gap between the linear variable filter and the linear sensor depends on a desired resolution in a spectral measurement by a user.

18. A method in accordance with claim 10, wherein the method is configured to provide both spot measurements and page width spatially resolved spectral imaging measurements.

* * * * *